United States Patent
Cai et al.

(10) Patent No.: US 8,912,770 B2
(45) Date of Patent: Dec. 16, 2014

(54) POWER CONVERSION FEEDBACK CONTROL CIRCUIT FOR REACHING A GOAL VOLTAGE

(75) Inventors: Charles Cai, San Jose, CA (US); Jeff Kotowski, Nevada City, CA (US); Kien Vi, San Jose, CA (US)

(73) Assignee: Atmel Corporation, San Jose, CA (US)

( * ) Notice: Subject to any disclaimer, the term of this patent is extended or adjusted under 35 U.S.C. 154(b) by 495 days.

(21) Appl. No.: 13/289,603

(22) Filed: Nov. 4, 2011

(65) Prior Publication Data

US 2013/0113445 A1 May 9, 2013

(51) Int. Cl.
*G05F 1/563* (2006.01)
*H02M 3/158* (2006.01)
*H05B 37/02* (2006.01)
*H02M 3/156* (2006.01)

(52) U.S. Cl.
CPC ............... *H02M 3/158* (2013.01); *Y02B 20/42* (2013.01); *H05B 37/02* (2013.01); *H02M 3/156* (2013.01); *Y10S 323/901* (2013.01)
USPC ............ 323/266; 323/268; 323/284; 323/901

(58) Field of Classification Search
USPC .................. 323/266, 268, 282, 284, 285, 901
See application file for complete search history.

(56) References Cited

U.S. PATENT DOCUMENTS

| | | | | |
|---|---|---|---|---|
| 7,446,518 B2 * | 11/2008 | Carpenter et al. | ............ | 323/285 |
| 7,671,575 B1 * | 3/2010 | Suzuki et al. | ................. | 323/285 |
| 2002/0125872 A1 * | 9/2002 | Groom et al. | ................. | 323/288 |
| 2005/0002134 A1 * | 1/2005 | Ohtake et al. | ................... | 361/18 |
| 2008/0238396 A1 * | 10/2008 | Ng et al. | ........................ | 323/284 |
| 2009/0224736 A1 | 9/2009 | Santo et al. | | |
| 2009/0267652 A1 | 10/2009 | Santo et al. | | |
| 2010/0066331 A1 * | 3/2010 | Chang et al. | .................. | 323/282 |
| 2010/0237786 A1 | 9/2010 | Santo et al. | | |
| 2010/0315057 A1 * | 12/2010 | Zambetti | ....................... | 323/284 |
| 2010/0327835 A1 * | 12/2010 | Archibald | ...................... | 323/282 |
| 2012/0104967 A1 * | 5/2012 | Lee et al. | ....................... | 315/291 |

* cited by examiner

*Primary Examiner* — Fred E Finch, III
(74) *Attorney, Agent, or Firm* — Fish & Richardson P.C.

(57) ABSTRACT

A power conversion circuit of two feedback loops is disclosed that includes a feedback control circuit for ramping up or down a commanded voltage to a load (e.g., LEDs). The second feedback loop feeds into the first feedback loop, and the second feedback loop operates at a slower bandwidth than the first feedback loop. When ramping up or down the commanded voltage, a voltage overshoot results because of delay in the system. The overshoot can be compensated for by a final adjustment to the commanded voltage.

16 Claims, 6 Drawing Sheets

POWER CONVERSION FEEDBACK CONTROL CIRCUIT FOR REACHING A GOAL VOLTAGE

TECHNICAL FIELD

This disclosure relates generally to electronics and more particularly to power conversion circuits.

BACKGROUND

Conventional power converters translate an input voltage Vin to a different output voltage Vout. The voltage Vout is controlled by a feedback circuit. The feedback circuit detects a feedback voltage, Vfb, coupled to the output and provides a signal to the power converter to adjust to make the feedback voltage Vfb closer to a reference voltage Vref. The power converter adjusts by increasing or decreasing Vout. The output voltage, Vout, is applied to a load. In some applications, it is useful to apply a different voltage Vout to the load depending on various conditions. For example, if the temperature of the load changes, adjusting the output voltage can increase the power efficiency of the load.

SUMMARY

A power conversion circuit of two feedback loops is disclosed that includes a feedback control circuit for ramping up or down a commanded voltage to a load (e.g., LEDs). The second feedback loop feeds into the first feedback loop, and the second feedback loop operates at a lower bandwidth than the first feedback loop. When ramping up or down the commanded voltage, a voltage overshoot results because of delay in the system. The overshoot can be compensated for by a final adjustment to the commanded voltage.

Particular implementations of a feedback control circuit for ramping up or down a commanded voltage can provide one or more of the following advantages: 1) the voltage at the load can be brought to a goal voltage in a shorter amount of time; 2) the load can be powered up in a short amount of time; 3) electronic components can be protected from damage by excessive voltages by quickly reducing the voltage at the load; 4) power consumption can be reduced by keeping the voltage at the load close to a goal voltage; 5) voltage overshoot can be reduced while ramping up or down the commanded voltage; and 6) good power factor correction can be achieved.

The details of one or more disclosed implementations are set forth in the accompanying drawings and the description below. Other features, aspects, and advantages will become apparent from the description, the drawings and the claims.

DETAILED DESCRIPTION

Example Power Conversion Circuit

Figure 1A:
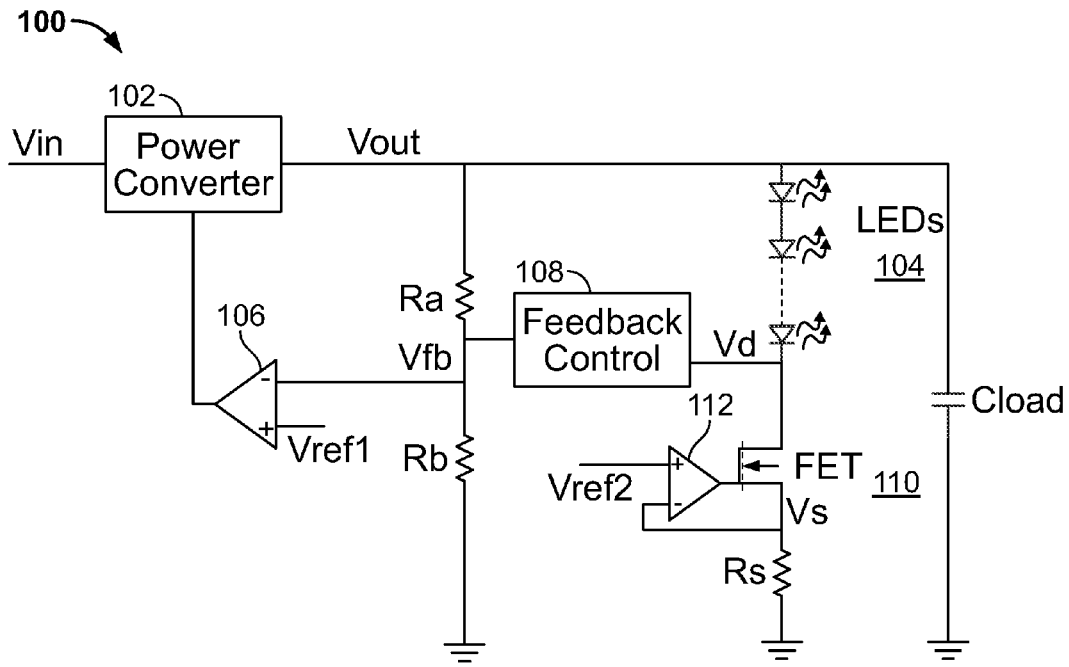
FIG. 1A is a block diagram of an example power conversion circuit.

FIG. 1A is a block diagram of an example power conversion circuit 100. The power conversion circuit 100 includes a power converter 102 to provide power to a string of one or more Light Emitting Diodes (LEDs) 104. Although LEDs 104 are illustrated, the power conversion circuit 100 can be used to provide power to any appropriate electrical load.

The power converter 102 includes a power input coupled to a power source and an output coupled to the string of LEDs 104. The power converter 102 is configured to convert an input voltage, Vin, on the power input to an output voltage, Vout, on the output. The conversion is based on a received signal at a control input, which can specify, for example, whether Vout should be increased or decreased relative to Vin.

Figure 1B:
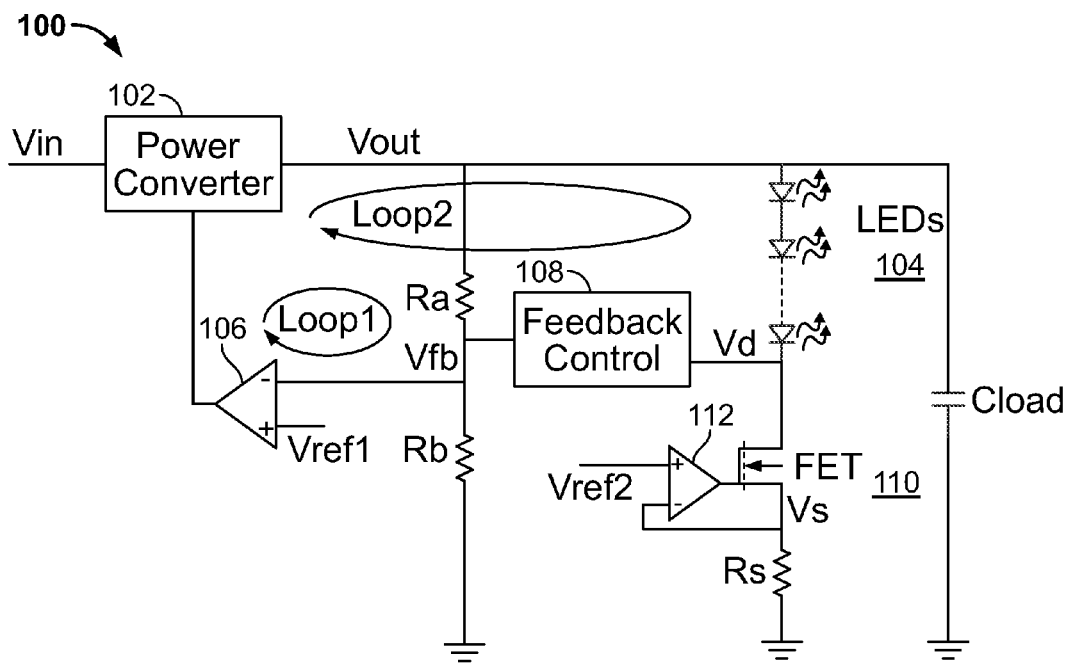
FIG. 1B is a block diagram of the example power conversion circuit showing two feedback loops, loop1 and loop2.

FIG. 1B is a block diagram of the example power conversion circuit 100 showing two feedback loops: loop1 and loop2. The first feedback loop, loop1, is implemented in a first feedback circuit coupled between the output of the power converter 102 and the control input of the power converter.

The first feedback circuit includes a resistor network of one or more resistors coupled to the output of the power converter 102 (e.g., resistors Ra and Rb as illustrated.) The first feedback circuit also includes a comparator 106. The comparator 106 has two inputs and an output. One of the comparator's inputs is coupled to the output of the power converter 102. For example, the input can be coupled to the output through the resistor network, e.g., between two resistors Ra and Rb and a ground node, at a feedback node Vfb. The other of the comparator's inputs is coupled to a reference voltage, Vref1. The output of the comparator is coupled to the control input of the power converter 102.

In operation, the first feedback circuit compares the voltage at the feedback node, Vfb, with the reference voltage Vref1. The first feedback circuit provides a control signal to the power converter 102 to increase Vout if Vfb is less than Vref1 and to decrease Vout if Vfb is greater than Vref1. The feedback voltage Vfb is the output voltage Vout as modified by the resistor network and the second feedback loop, loop2.

The second feedback loop, loop2, is implemented in a second feedback circuit coupled between the load (LEDs 104) and the first feedback circuit. The second feedback circuit includes a feedback control circuit 108. The feedback control circuit 108 includes a detection input coupled to the string of LEDs 104 and a control output coupled to the feedback node Vfb of the first feedback circuit. The feedback control circuit 108 can be implemented as a digital logic circuit, for example. The second feedback circuit also includes a current source circuit between the string of LEDs 104 and a ground node.

Any appropriate current source circuit can be used in the power conversion circuit. The current source circuit illustrated in FIG. 1B includes a field-effect transistor (FET) 110. The FET 110 includes a gate, a source, and a drain. The current source circuit also includes a comparator 112. The comparator 112 includes first and second inputs and an output. The first input of the comparator 112 is coupled to the source of the FET 110. The second input of the comparator 112 is coupled to a reference voltage, Vref2. The comparator output is coupled to the gate of the FET 110. The drain of the FET 110 is coupled to the LEDs 104. A resistor Rs is coupled between the source of the FET 110 and a ground node. The current source keeps the current flowing through the LEDs 104 constant and equal to Vref2/Rs.

The detection input of the feedback control circuit 108 can be coupled directly or indirectly to the LEDs 104. For example, as illustrated in FIG. 1B, the detection input of the feedback control circuit 108 is directly connected to the drain of the FET 110. Alternatively, the detection input of the feedback control circuit 108 can be directly connected to the gate of the FET 110.

In operation, the second feedback circuit provides additional feedback to the power converter 102 to adjust Vout. The additional feedback serves to regulate the voltage at the drain or gate of the FET 110, and thus serves to regulate the current flowing through the LEDs 104. For example, the second feedback circuit can be configured to regulate the voltage at the drain of the FET 110, Vd, to a certain voltage, Vdoptimal.

Vdoptimal can be selected to be just high enough to keep the FET 110 working in its saturation region. When the temperature of the circuit changes, the forward voltage of the LEDs changes, which will make Vd higher or lower than Vdoptimal. When Vd is lower than Vdoptimal, the FET 110 can operate in its triode region, so the current flowing through the FET 110 and hence the LEDs 104 can decrease, instead of being kept constant. In this case, the second feedback circuit can sink current from the first feedback circuit (e.g., at the feedback node Vfb) to increase Vout until Vd is equal to or about Vdoptimal.

When Vd is higher than Vdoptimal, a larger than necessary voltage can drop on the FET 110, which can waste power and potentially damage the FET 110 due to high power dissipation. In this case, the second feedback circuit can source current into the first feedback circuit (e.g., at the feedback node Vfb) to decrease Vout until Vd is equal to or about Vdoptimal.

The first feedback circuit is configured to operate at a first bandwidth, and the second feedback circuit is configured to operate at a second bandwidth. The bandwidth of a feedback circuit is a measure of how fast it can propagate a signal through the circuit and can be measured, for example, in Hertz. In the example power conversion circuit 100, the second bandwidth is slower than the first bandwidth. To achieve stability in the power conversion circuit 100, the second bandwidth can be substantially slower than the first bandwidth.

For example, in some applications, the bandwidth of the first feedback circuit is based on a bandwidth at the power source, which can be the public utility grid. The power converter can have a slow bandwidth to achieve good power factor correction. A single stage offline power converter with power factor correction can have a slow bandwidth, e.g., about 10 Hz to 20 Hz, to achieve a good power factor. In applications with such a power converter, the second feedback circuit can operate at a bandwidth significantly slower than the bandwidth of the first feedback circuit.

Typically, the bandwidth of the second feedback circuit is based on the operation of the feedback control circuit 108. For example, the feedback control circuit 108 can change the voltage on its control output to the feedback node Vfb in small increments and wait a long (long relative to the bandwidth of the first feedback circuit) time before adjusting that voltage again.

Figure 2:
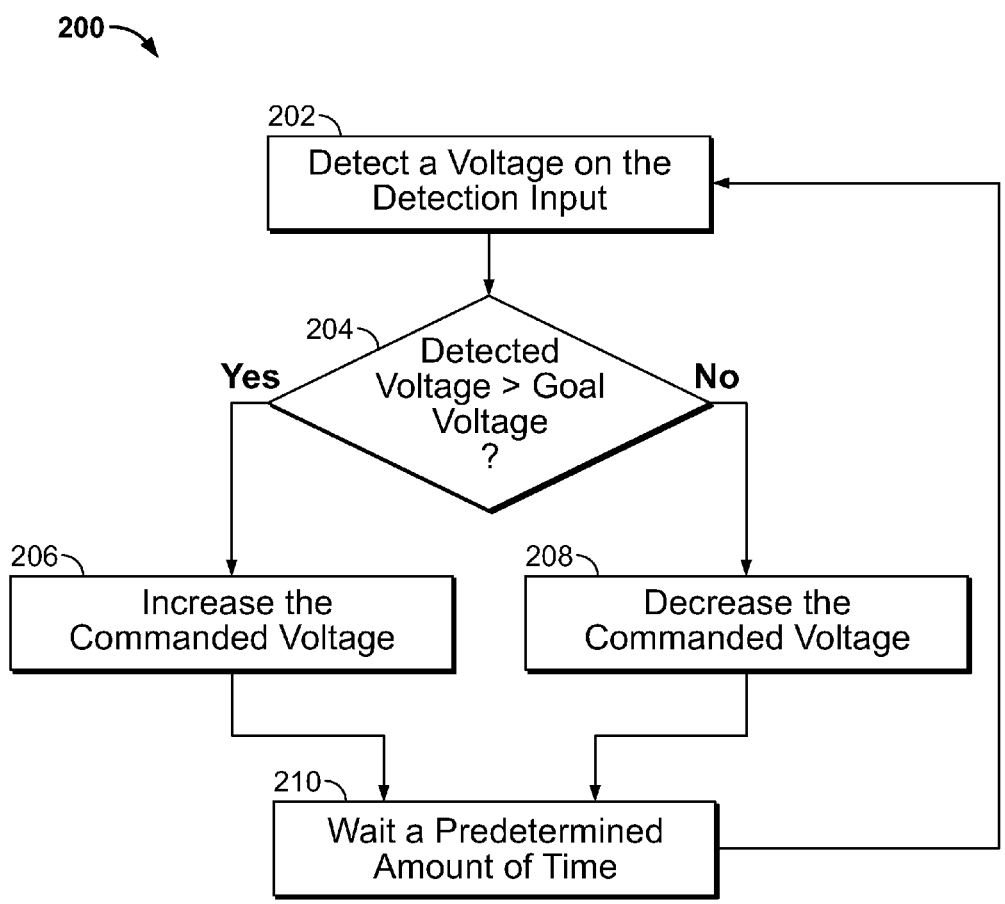
FIG. 2 is a flow diagram of an example process performed by the feedback control circuit during normal operation.
Figure 3:
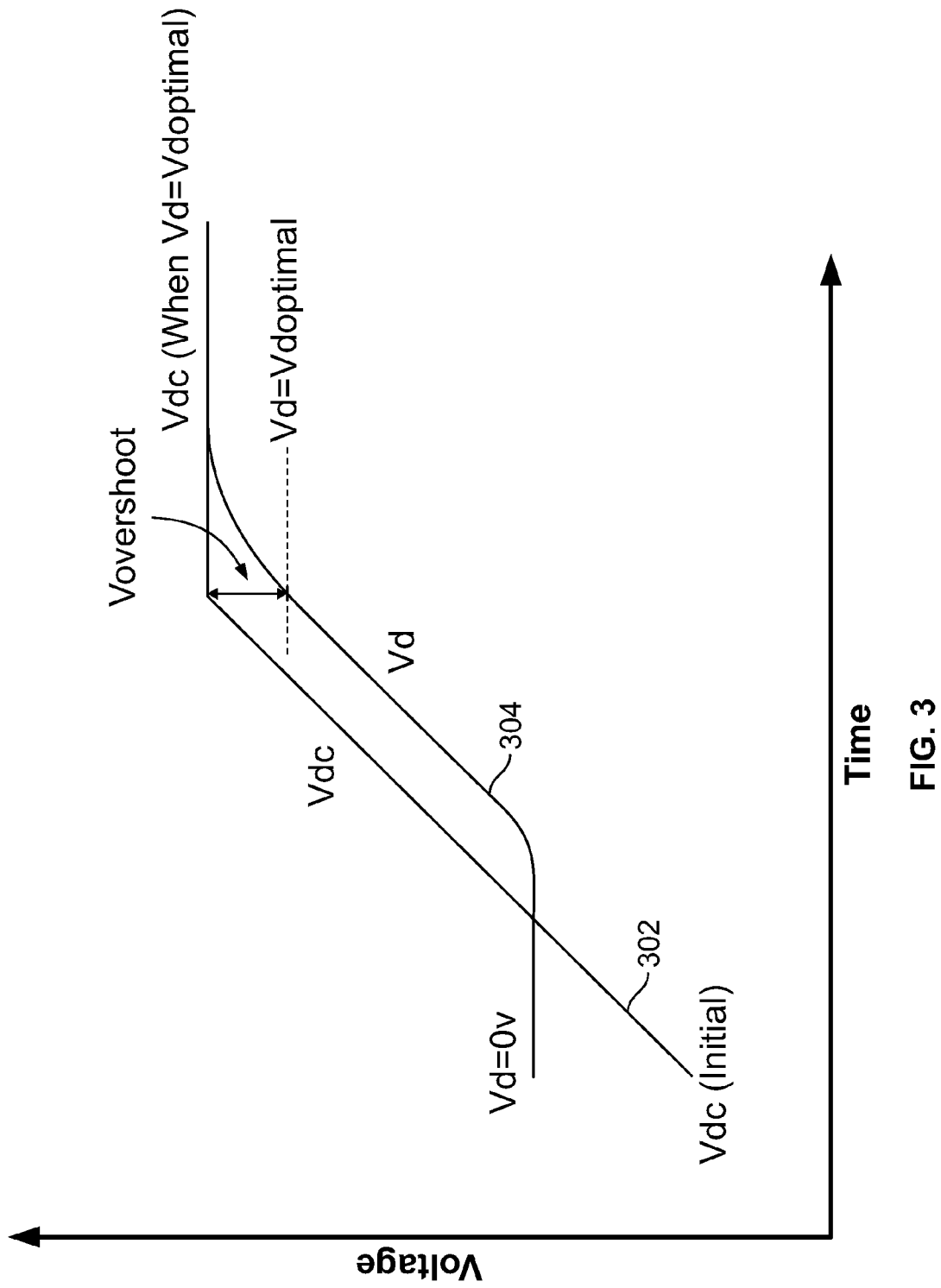
FIG. 3 is an example voltage diagram for a ramping up mode of the feedback control circuit.
Figure 4:
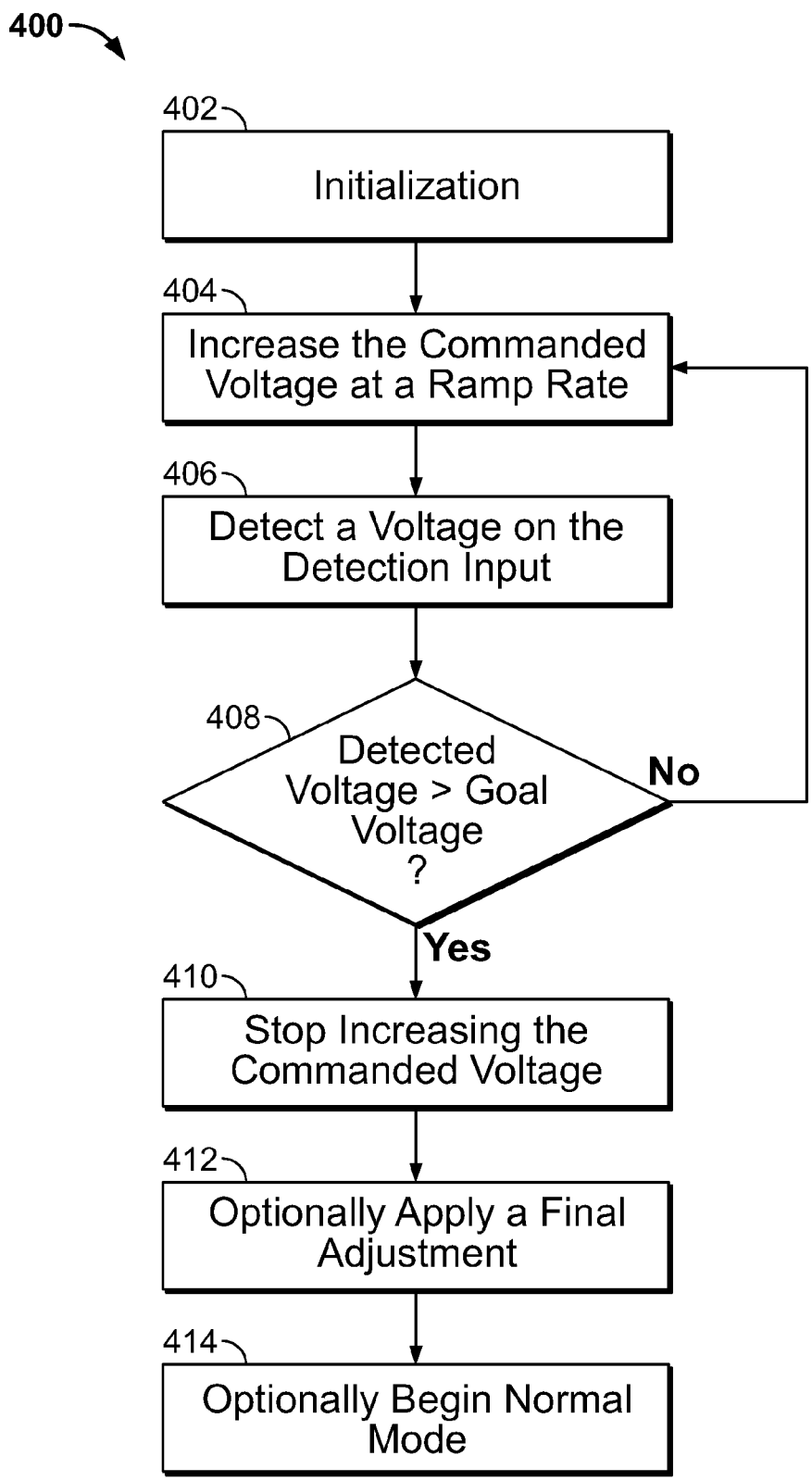
FIG. 4 is a flow diagram of an example process performed by the feedback control circuit during a ramping up mode.
Figure 5:
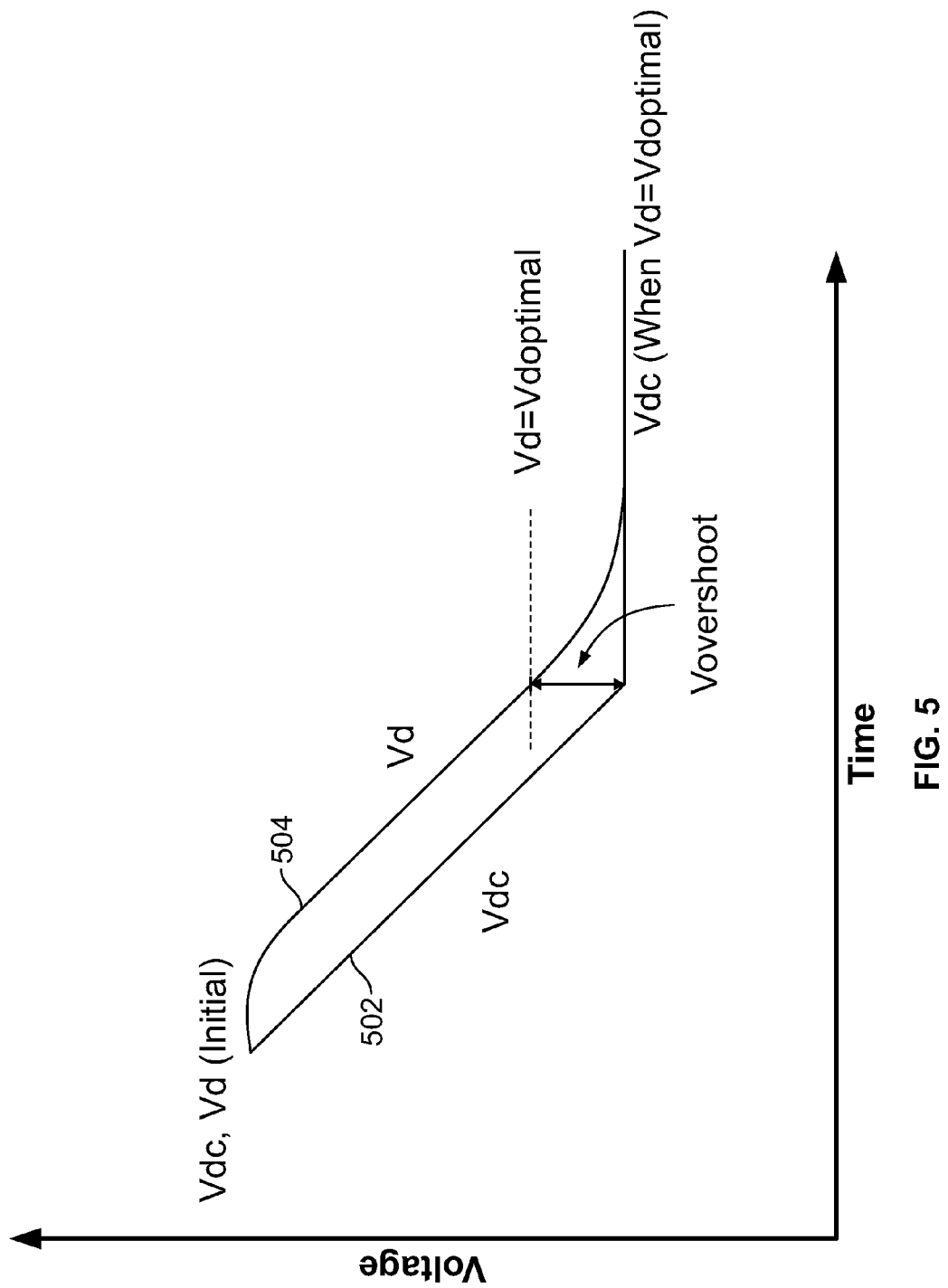
FIG. 5 is an example voltage diagram for a ramping down mode of the feedback control circuit.
Figure 6:
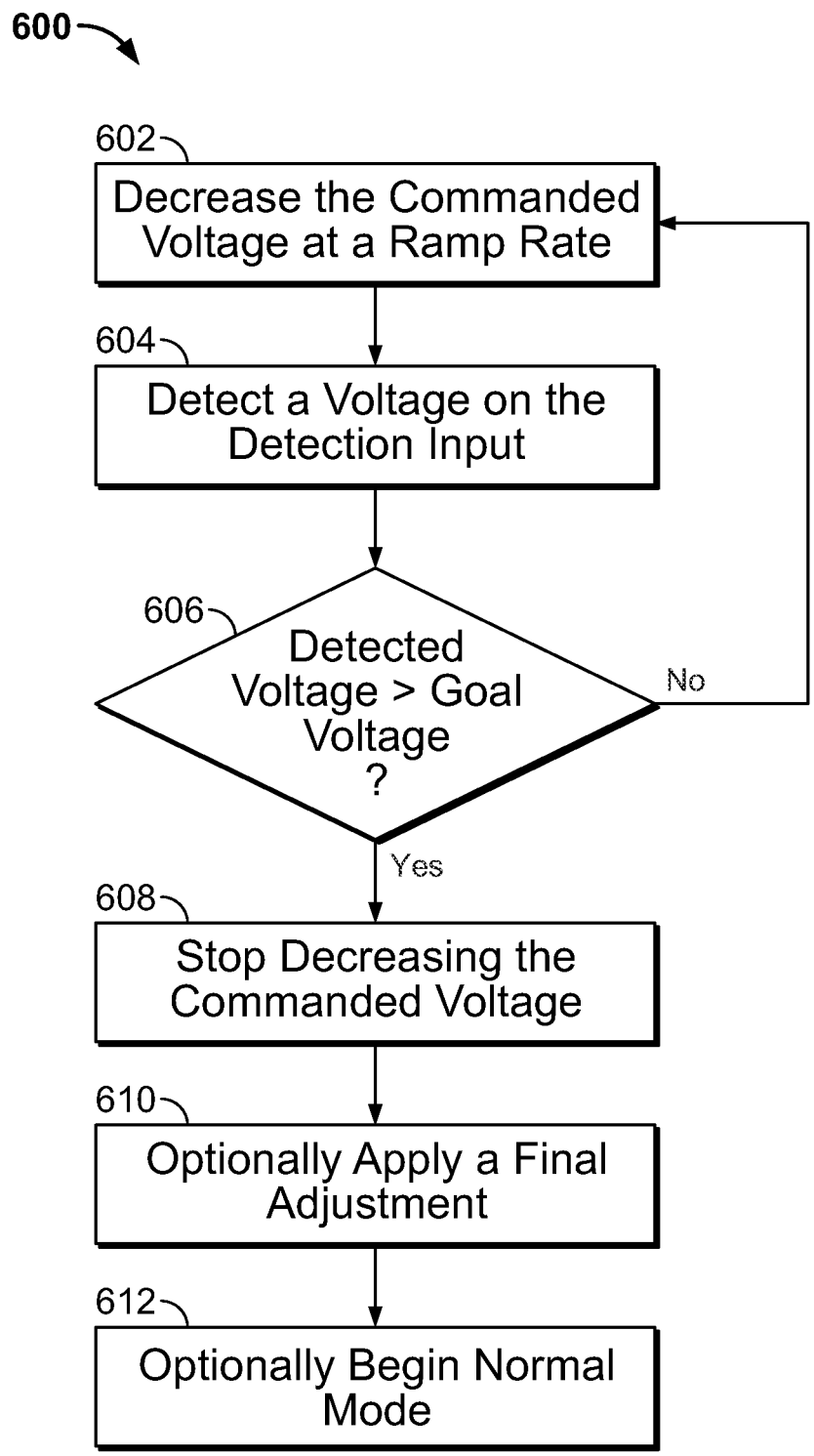
FIG. 6 is a flow diagram of an example process performed by the feedback control circuit during a ramping down mode.

The feedback control circuit 108 can operate in various modes, including, for example, a normal mode, a ramping up mode, and a ramping down mode. FIG. 2 describes the operations of the feedback control circuit 108 in the normal mode. FIGS. 3-4 describe the ramping up mode. FIGS. 5-6 describe the ramping down mode.

Normal Mode Flowchart

FIG. 2 is a flow diagram of an example process 200 performed by the feedback control circuit 108 during normal operation.

The feedback control circuit detects the voltage on its detection input (step 202). The detected voltage can be, for example, the voltage on the drain or the gate of the FET 110 of FIG. 1. The feedback control circuit compares the detected voltage with a goal voltage (step 204). The goal voltage can be, for example, Vdoptimal, selected as described above.

If the detected voltage is greater than the goal voltage, the feedback control circuit decreases a commanded voltage on its control output (step 206). If the detected voltage is less than the goal voltage, the feedback control circuit increases the commanded voltage on its control output (step 208). The feedback control circuit waits a certain amount of time (step 210). The amount of time can be selected, for example, to allow the first feedback loop to settle so that the power conversion circuit 100 is stable. In some implementations, for example where the power converter 102 has a unit gain bandwidth greater than or equal to 10 Hz, the certain amount of time is 100 ms.

In the normal mode, because the feedback control circuit waits the certain amount of time between making adjustments, the feedback control circuit cannot adjust the commanded voltage very quickly. In some situations it is useful to adjust the commanded voltage more quickly than is possible in the normal mode. For example, it can be useful to quickly increase the commanded voltage when powering up the system, and it can be useful to quickly decrease the commanded voltage when the FET 110 is under risk of being burned out due to excessive power dissipation. In these situations, the feedback control circuit can operate in a ramping up mode or a ramping down mode.

Ramping Up Voltage Diagram

FIG. 3 is an example voltage diagram for a ramping up mode of the feedback control circuit 108. Voltage is on the vertical axis and time is on the horizontal axis. The ramping up mode can be useful, for example, when powering up the power conversion circuit.

A first curve 302 represents the commanded voltage Vdc on the control output of the feedback control circuit 108. A second curve 304 represents the detected voltage on the detection input of the feedback control circuit 108. In this example, the detected voltage is the voltage Vd on the drain of the FET 110; however, the detected voltage can be a different voltage, for example, the voltage on the gate of the FET 110.

As indicated by the first curve 302, the feedback control circuit 108 ramps the commanded voltage Vdc from an initial, low commanded voltage to a high voltage until the detected voltage Vd is equal to a goal voltage. In this example, the goal voltage is Vdoptimal, described above. After the detected voltage Vd is equal to or about equal to Vdoptimal, the ramp is stopped.

Because there is delay in the first feedback circuit, the detected voltage Vd does not follow the commanded voltage Vdc immediately. As indicated by the second curve 304, the detected voltage Vd follows the commanded voltage Vdc after some delay. So, even though the feedback control circuit 108 stops ramping when Vd is equal to or about equal to Vdoptimal, Vd continues to increase until it settles to a final value. The difference between the final value and Vdoptimal is an overshoot voltage, Vovershoot. This overshoot voltage can cause additional power consumption, e.g., in the FET 110, so it is generally useful to minimize Vovershoot.

Vovershoot varies based on the ramping rate and the bandwidth of the first feedback circuit. If the first feedback circuit is modeled as a first order loop with unit gain bandwidth Fugbw, given in Hz, and the ramping rate of the feedback control circuit 108 is a constant K, given in Volts per second (V/s), then $$Vovershoot = \frac{K}{2\pi Fugbw}.$$

Given a certain Fugbw and a goal Vovershoot, the ramping rate K can be selected to minimize the time of the ramp while keeping Vovershoot to or below that goal Vovershoot. For example, for a power converter with Fugbw greater than or equal to 10 Hz, the ramping rate K can be selected to be 100 V/s, resulting in a Vovershoot less than or equal to 1.6 V.

At the end of the ramp, the feedback control circuit 108 can apply a final adjustment to the commanded voltage Vdc. For example, the final adjustment can be a certain decrease in the commanded voltage, or a certain increase in the commanded voltage. In FIG. 3, the first curve 302 and the second curve 304 eventually meet at a voltage greater than Vdoptimal. A certain decrease in the commanded voltage Vdc can bring the detected voltage Vd closer to Vdoptimal.

Ramping Up Flowchart

FIG. 4 is a flow diagram of an example process 400 performed by the feedback control circuit 108 during a ramping up mode.

The feedback control circuit performs initialization (step 402). For example, the feedback control circuit can set the commanded voltage on its control output to an initial value, which can be the minimum voltage, e.g., 0 V. In some implementations, the feedback control circuit waits for the detected voltage to stabilize, e.g., so that variations in the detected voltage are below a threshold variation. This is useful, for example, when the power converter 102 is starting up.

The feedback control circuit increases the commanded voltage at a certain ramp rate (step 404). For example, the certain ramp rate can be selected as described above with reference to FIG. 3. Increasing the commanded voltage at the certain ramp rate can include, for example, increasing the commanded voltage by a certain increment after a fixed amount of time has passed. The feedback control circuit need not wait for the detected voltage to stabilize, or to wait for the certain amount of time for the normal mode described above with respect to FIG. 2.

While the feedback control circuit is increasing the commanded voltage, the feedback control circuit detects the voltage on its detection input (step 406). The detected voltage can be, for example, the voltage on the drain or the gate of the FET 110 of FIG. 1. The feedback control circuit compares the detected voltage with a goal voltage (step 408). The goal voltage can be, for example, Vdoptimal, selected as described above.

If the detected voltage is less than the goal voltage, the feedback control circuit continues increasing the commanded voltage (return to step 404). If the detected voltage is greater than or equal to the goal voltage, the feedback control circuit stops increasing the commanded voltage (step 410). The feedback control circuit optionally applies a final adjustment to the commanded voltage, e.g., as described above with respect to FIG. 3 (step 412). The feedback control circuit optionally begins operating in a normal mode, e.g., as described above with respect to FIG. 2 (step 414).

Ramping Down Voltage Diagram

FIG. 5 is an example voltage diagram for a ramping down mode of the feedback control circuit 108. Voltage is on the vertical axis and time is on the horizontal axis. The ramping down mode can be useful, for example, when powering down quickly to avoid damage to parts of the circuit.

A first curve 502 represents the commanded voltage Vdc on the control output of the feedback control circuit 108. A second curve 504 represents the detected voltage on the detection input of the feedback control circuit 108. In this example, the detected voltage is the voltage Vd on the drain of the FET 110; however, the detected voltage can be a different voltage, for example, the voltage on the gate of the FET 110.

As indicated by the first curve 502, the feedback control circuit 108 ramps the commanded voltage Vdc from an initial, high commanded to voltage to a low voltage until the detected voltage Vd is equal to a goal voltage. In this example, the goal voltage is Vdoptimal, described above. After the detected voltage Vd is equal to or about equal to Vdoptimal, the ramp is stopped.

Because of the delay of the first feedback circuit, there is a delay between the commanded voltage and the detected voltage, as described above with reference to FIG. 3. There is also an overshoot voltage, Vovershoot, which is negative when ramping down.

Ramping Down Flowchart

FIG. 6 is a flow diagram of an example process 600 performed by the feedback control circuit 108 during a ramping down mode.

The feedback control circuit decreases the commanded voltage at a certain ramp rate (step 402). For example, the certain ramp rate can be selected as described above with reference to FIG. 3. Decreasing the commanded voltage at the certain ramp rate can include, for example, decreasing the commanded voltage by a certain increment after a fixed amount of time has passed. The feedback control circuit need not wait for the detected voltage to stabilize, or to wait for the certain amount of time for the normal mode described above with respect to FIG. 2.

While the feedback control circuit is decreasing the commanded voltage, the feedback control circuit detects the voltage on its detection input (step 604). The detected voltage can be, for example, the voltage on the drain or the gate of the FET 110 of FIG. 1. The feedback control circuit compares the detected voltage with a goal voltage (step 606). The goal voltage can be, for example, Vdoptimal, selected as described above.

If the detected voltage is greater than the goal voltage, the feedback control circuit continues increasing the commanded voltage (return to step 602). If the detected voltage is greater than or equal to the goal voltage, the feedback control circuit stops decreasing the commanded voltage (step 608). The feedback control circuit optionally applies a final adjustment to the commanded voltage, e.g., as described above with respect to FIG. 3 (step 610). The feedback control circuit optionally begins operating in a normal mode, e.g., as described above with respect to FIG. 2 (step 612).

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A power conversion circuit comprising:
    a power converter comprising a power input coupled to a power source, an output coupled to a load, and a control input, wherein the power converter is configured to convert an input voltage on the power input to an output voltage on the output based on the control input;
    a first feedback circuit coupled between the output of the power converter and the control input of the power converter, wherein the first feedback circuit is configured to operate at a first bandwidth;
    a second feedback circuit coupled between the load and the first feedback circuit, wherein the second feedback circuit is configured to operate at a second bandwidth slower than the first bandwidth, and wherein the second feedback circuit is configured to change a commanded voltage to the first feedback circuit at a fixed ramp rate until a detected voltage at the load crosses a goal voltage and overshoots the commanded voltage, and after the detected voltage crosses the goal voltage and overshoots the commanded voltage, decrease or increase the commanded voltage by an overshoot compensation amount to cause the detected voltage to reach the goal voltage at a rate different than the fixed ramp rate.

2. The power conversion circuit of claim 1, wherein the first feedback circuit comprises:
    a resistor network coupled to the output of the power converter; and
    a comparator comprising first and second inputs and a comparator output;
    wherein the first input of the comparator is coupled to a reference voltage, the second input of the comparator is coupled to the resistor network, and the comparator output is coupled to the control input of the power converter.

3. The power conversion circuit of claim 1, wherein the second feedback circuit comprises:
    a feedback control circuit coupled between the load and the first feedback circuit; and
    a current source circuit coupled to the load and the feedback control circuit.

4. The power conversion circuit of claim 3, wherein the current source circuit comprises:
    a field-effect transistor comprising a gate, a source, and a drain; and
    a comparator comprising first and second inputs and a comparator output; and
    wherein the first input of the comparator is coupled to a reference voltage, the second input of the comparator is coupled to the source of the field-effect transistor, the comparator output is coupled to the gate of the field-effect transistor, and the drain is coupled to the load.

5. The power conversion circuit of claim 4, wherein the feedback control circuit is directly connected to the drain of the field-effect transistor or the gate of the field-effect transistor.

6. The power conversion circuit of claim 1, wherein the second feedback circuit is further configured to operate in a normal mode after detecting the goal voltage at the load, including performing operations comprising: comparing the detected voltage to the goal voltage, adjusting the commanded voltage, and waiting a certain amount of time to allow the detected voltage to settle before adjusting the commanded voltage again.

7. A method performed by a feedback control circuit for a second feedback circuit, the method comprising:
    setting a commanded voltage on a commanded output to an initial value, the commanded output being coupled to a first feedback circuit, the first feedback circuit being coupled to a power converter, the power converter being coupled to a load;
    changing the commanded voltage at a fixed ramp rate;
    detecting a detected voltage on a detection input coupled to the load;
    changing the commanded voltage at the fixed ramp rate until the detected voltage crosses a goal voltage, wherein the fixed ramp rate is selected so that the detected voltage overshoots the commanded voltage by an amount within a range; and
    after the detected voltage crosses the goal voltage and overshoots the commanded voltage, decreasing or increasing the commanded voltage by an overshoot compensation amount to cause the detected voltage to reach the goal voltage at a rate different than the fixed ramp rate.

8. The method of claim 7, wherein changing the commanded voltage at the ramp rate until the detected voltage crosses a goal voltage comprises:
    increasing the commanded voltage at the ramp rate until the detected voltage is greater than or about equal to the goal voltage; or
    decreasing the commanded voltage at the ramp rate until the detected voltage is less than or about equal to the goal voltage.

9. The method of claim 7, further comprising:
    after the detected voltage crosses the goal voltage, operating in a normal mode, including comparing the detected voltage to the goal voltage, adjusting the commanded voltage, and waiting a certain amount of time to allow the detected voltage to settle before adjusting the commanded voltage again.

10. The method of claim 7, further comprising:
    prior to setting the commanded voltage to the initial value, waiting until the detected voltage is stable.

11. The method of claim 7, wherein the first feedback circuit is coupled between an output of the power converter and a control input of the power converter.

12. The method of claim 7, wherein the first feedback circuit comprises:
    a resistor network coupled to the output of the power converter; and
    a comparator comprising first and second inputs and a comparator output;
    wherein the first input of the comparator is coupled to a reference voltage, the second input of the comparator is coupled to the resistor network, and the comparator output is coupled to the control input of the power converter.

13. A feedback control circuit comprising:

a detection input and a commanded output, the detection input being configured for coupling to a load and the commanded output being configured for coupling to a first feedback circuit; and a digital logic circuit configured to perform operations comprising:

setting a commanded voltage on the commanded output to an initial value, the commanded output being coupled to the first feedback circuit, the first feedback circuit being coupled to a power converter, the power converter being coupled to the load;

changing the commanded voltage at a fixed ramp rate;

detecting a detected voltage on the detection input coupled to the load;

changing the commanded voltage at the fixed ramp rate until the detected voltage crosses a goal voltage, wherein the fixed ramp rate is selected so that the detected voltage overshoots the commanded voltage; and after the detected voltage crosses the goal voltage and overshoots the commanded voltage, decreasing or increasing the commanded voltage by an overshoot compensation amount to cause the detected voltage to reach the goal voltage at a rate different than the fixed ramp rate.

14. The feedback control circuit of claim 13, wherein changing the commanded voltage at the ramp rate until the detected voltage crosses a goal voltage comprises:

increasing the commanded voltage at the ramp rate until the detected voltage is greater than or about equal to the goal voltage; or decreasing the commanded voltage at the ramp rate until the detected voltage is less than or about equal to the goal voltage.

15. The feedback control circuit of claim 13, the operations further comprising:

after the detected voltage crosses the goal voltage, operating in a normal mode, including comparing the detected voltage to the goal voltage, adjusting the commanded voltage, and waiting a certain amount of time to allow the detected voltage to settle before adjusting the commanded voltage again.

16. The feedback control circuit of claim 13, the operations further comprising:

prior to setting the commanded voltage to the initial value, waiting until the detected voltage is stable.

\* \* \* \* \*